March 26, 1957 W. F. BLOCK 2,786,470

DEVICE FOR HOLDING TABULATING CARDS ON VISIBLE INDEX CARD HOLDERS

Filed Aug. 13, 1954

INVENTOR.
WILHELM F. BLOCK
BY Clyde A. Norton
Roland T. Booth
ATTORNEYS.

United States Patent Office 2,786,470
Patented Mar. 26, 1957

2,786,470

DEVICE FOR HOLDING TABULATING CARDS ON VISIBLE INDEX CARD HOLDERS

Wilhelm F. Block, White Plains, N. Y., assignor to Sperry Rand Corporation, a corporation of Delaware Application August 13, 1954, Serial No. 449,664

3 Claims. (Cl. 129—16.7)

This invention relates to means for supporting a tabulating card in association with a visible index card holder.

Visible index systems are well known and concern a series of card holders which are disposed in substantially flat relation on a tray and overlapped so that the lower edge of one holder is visible below the lower edge of the preceding holder. Account cards are suitably mounted on these holders on the front surface thereof as the tray is pulled out for examination of the cards. To examine any one card as to data on its account the preceding holders are turned up and back to expose the upper face of the desired card. In doing this, it is obvious that the back surface of the preceding holder is thus turned up to view.

The object of the invention is to take advantage of this exposed back surface to support thereon a tabulator or punched card relating to the index card the front surface of which is exposed just below it as above mentioned. It is thus clear that the tabulator cards relating to a given account can therefore be mounted in the visible index system in close association with the account card with which it is related instead of having to be filed in a separate drawer or compartment as heretofore.

In brief and general terms the invention comprises a support sheet or card for the tabulator card and having a guide channel and an entry slot therein. This sheet is disposed on the back of a holder in the manner in which cards are connected to the holder, and the tabulator card is slipped into the entry slot and guided along the channel in the bottom of the supporting sheet and is held securely therein to be instantly visible and available when the index card with which it is associated is exposed to view.

A present preferred form which the invention may assume is illustrated in the drawings of which, Fig. 1 is a plan view of two adjacent card holders with the preceding one turned up and back to expose the one beneath;

Figures 1, 2, 3, 4, 5:
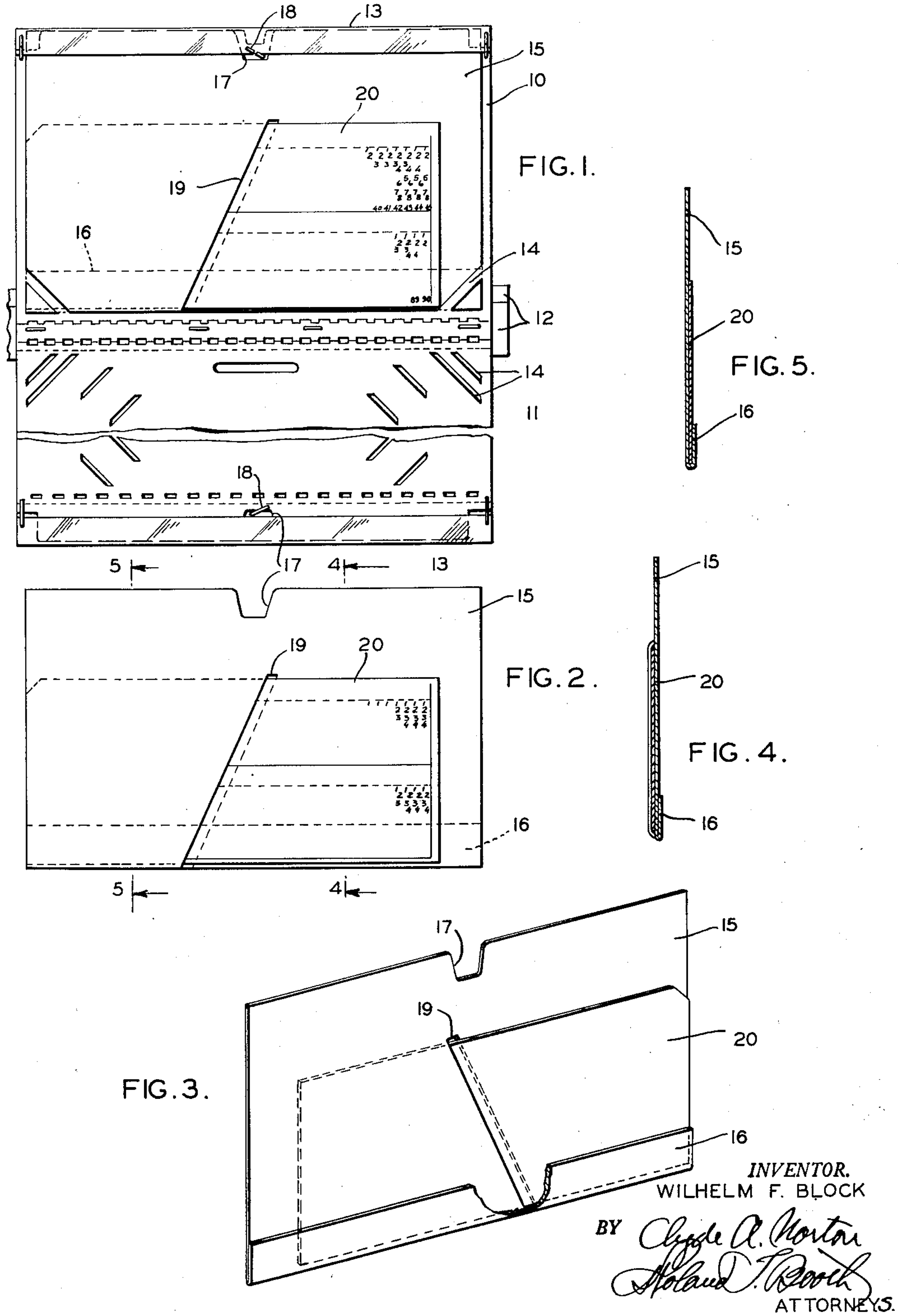
Fig. 2 is a plan view of a supporting sheet for a supplemental or tabulator card with the tabulator card in position thereon.
Fig. 3 is a perspective view of the same with a portion broken away, and viewed from the back of Fig. 2.
Fig. 4 is a vertical cross section taken on the line 4—4 of Fig. 2.
Fig. 5 is a vertical cross section taken on the line 5—5 of Fig. 2.

Referring now merely to the specific form of the invention shown in the drawings, it is seen that a pair of visible index system card holders 10 and 11 are illustrated in Fig. 1 and each connected in the usual manner for pivotal movement to its lug 12. This lug projects beyond the lateral edges of its associated holder to be engaged in channels in a supporting tray for a number of holders in the usual manner. The card holders are mounted in overlapping, off-set, interengaged relation with the lug 12 on each card cooperating with the lug of adjacent cards in a well known manner. The major portion of each holder is pivotally disposed on its lug 12 so that this portion may be turned back as shown in Fig. 1 to expose cards supported on the rear face as well as to expose the front face of the succeeding holder. The lower edge of each holder is provided with the well known transparent tip 13 and with the diagonal slots 14 to receive the corners of index cards therein as is well known.

With the holders disposed as shown in Fig. 1 and assuming that there is a record or index card disposed on the upper face of the lower holder 11, it can well be imagined that it would be desired to have its associated tabulating card closely related thereto in the same filing device instead of filed away in a separate compartment. To that end therefore, a supporting sheet or card 15 is attached to the rear face of holder 10 with its upper edge slipped in the usual manner beneath the tip 13 and its lower corners slipped into the diagonal slots 14. The lower edge of this supporting card 15 is folded up as at 16 to form a guide channel. The upper edge of the card 15 is cut away as at 17 so that when it is slipped under the tip 13 on the back face of holder 10 it will not be obstructed by the usual staple 18 thereon. This card or sheet 15 is formed with a diagonal slot 19 which extends downwardly from about a mid-height of the card and to the left to the bottom of the channel fold of the sheet as shown in Fig. 2.

This card or sheet 15 is disposed as above described on the back of a holder such as 10 as shown in Fig. 1, and then a supplemental or punched card 20 is slipped into the slot 19 and its left edge is moved over to the left until it is stopped by the juncture between the slot 14 and the main body of the holder 10. During this movement the lower edge of the card 20 is sliding along the bottom of the channel formed by the folded portion 16 of the sheet 15. Thus it is seen that a snug housing is formed for the tabulator card 20. The close relation of the parts forming the channel and the adjacent surfaces of the holder 10 cause enough friction on the tabulator card 20 to hold it securely in place. The right end of this card 20 is visible as shown in Fig. 2 and can be easily grasped in the hand to remove it from its housing when it is desired to use it. It is thus also to be noted that when so housed, the card 20 is adjacent the record index card with which its data is related and which record index card is mounted in the next succeeding holder 11.

It can thus be seen that there has been provided a supporting sheet with a bottom channel fold and a diagonal slot extending downward to said channel portion, said channel and slot adapted to receive and support a supplemental card such as a tabulator card; that there has been provided the combination of such a unit removably attached to the back of the usual visible index card holder so that the supplemental card may be held in close adjacency in the same device with the index card bearing data relating to that punched on the tabulator card.

While I have described what I believe to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim is:

1. In combination with a series of visible index card holders, each holder having a tip and diagonal slots to receive an index card thereon, a supporting sheet attached to the back of said holder by means of said said tip and slots, said sheet having a bottom upturned fold acting as a channel guide, and having a sloping slot extending downwardly and to the left to the bottom of the channel fold of the sheet, and a punched tabulator card inserted into said channel guide through said sloping slot and extending to the left end thereof to abut the material of the holder said tabulator card having information thereon related to that on the card on the front face of the next subsequent holder in the series.

2. In combination with a series of visible index card holders, each holder having a tip and diagonal slots to receive an index card thereon, a supporting sheet attached to the back of said holder by means of said tip and slots, said sheet having a bottom upturned fold acting as a channel guide, and having a sloping slot extending downwardly and to the left to the bottom of the channel fold of the sheet, and a punched tabulator card inserted into said channel guide through said sloping slot and extending to the left end thereof to abut the material of the holder the close adjacency of the walls of the channel guide, the sheet, and the holder causing the frictional securement of the punched tabulator card in inserted position said tabulator card having information thereon related to that on the card on the front face of the next subsequent holder.

3. In combination with a series of overlapping visible index card holders, an index card attached to the front face of each of said holders, a supporting sheet attached to the rear face of each of said holders, a bottom upturned fold on each of said sheets to act as a channel guide, each of said sheets having a slot thereon extending downwardly to the bottom of the fold, and a tabulating card insertable in said slot and slidable in said channel, said tabulating card having information thereon relating to the data on the index card of the next adjacent holder in the series.

References Cited in the file of this patent

UNITED STATES PATENTS

| | | |
|---|---|---|
| 1,741,467 | Land | Dec. 31, 1929 |
| 2,370,074 | Roscoe | Feb. 10, 1945 |

FOREIGN PATENTS

| | | |
|---|---|---|
| 30,146/30 | Australia | Nov. 14, 1930 |
| 26,674/30 | Australia | May 21, 1931 |